(No Model.)

W. H. REIFF.
SPELLING TOY AND PUZZLE.

No. 259,920. Patented June 20, 1882.

WITNESSES:
Francis McArdle
C. Sedgwick

INVENTOR:
W. H. Reiff
BY Munn & Co
ATTORNEYS.

UNITED STATES PATENT OFFICE.

WILLIAM H. REIFF, OF PHILADELPHIA, PENNSYLVANIA, ASSIGNOR TO ROGERS, PEET & CO., OF NEW YORK, N. Y.

SPELLING TOY AND PUZZLE.

SPECIFICATION forming part of Letters Patent No. 259,920, dated June 20, 1882.

Application filed May 16, 1882. (No model.)

*To all whom it may concern:*

Be it known that I, WILLIAM H. REIFF, of Philadelphia, in the county of Philadelphia and State of Pennsylvania, have invented a new and Improved Spelling Toy and Puzzle, of which the following is a full, clear, and exact description.

The object of my invention is to furnish a device for the use of children in learning to spell, and to construct such device as an interesting toy likely to attract attention.

To that end my invention consists in the spelling toy and puzzle hereinafter described and claimed.

Reference is to be had to the accompanying drawings, forming part of this specification, in which similar letters of reference indicate corresponding parts in both the figures.

Figure 1:
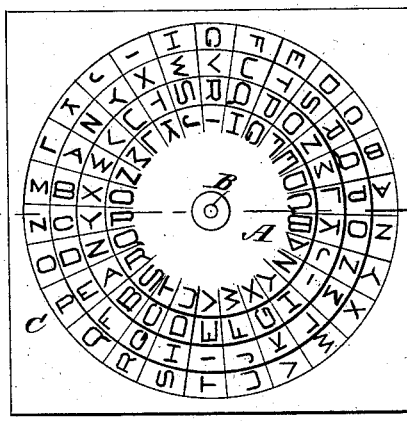
Figure 2:
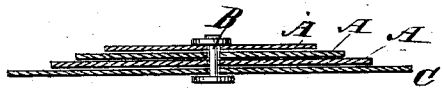

Figure 1 is a face view of the device. Fig. 2 is a cross-section of the same.

The device consists of circular disks or dials A, made of card-board or other suitable material laid one upon another and attached together by a center pin or rivet, B, on which the dials are free to turn. I prefer to use four dials, as shown, to allow the spelling of words in four letters; but they may be more or less in number and vary in size, the top or outer dial being the smallest and the others increasing in size regularly to the lower one, which is the largest, and which I prefer should be of the square form shown. Upon the faces of the dials A, next their outer edges, are printed or otherwise fixed the letters of the alphabet in regular order, those upon the bottom dial being arranged in a circle around the dial next above.

With this device any word of four letters or less can be spelled by turning the dials to bring the letters of the words in radial lines, the first letter of the word being upon the bottom dial, as indicated at *c* in the drawings, wherein the word "pear" is shown. The turning of the dials and the finding of the letters will interest the child, and the device is further made interesting from the fact that when some words are spelled out other complete words may be found upon the device, as, for instance, the word "pear" being spelled, it is found by looking at the dial the word "lawn" appears in another place. There are a great many words that will work out in this manner, and the device may thus be used as a puzzle.

I do not limit myself to any special arrangement of the letters or any particular number of dials. The back of the bottom dial may be printed with directions, test-words, or other information, as desired.

Having thus fully described my invention, I claim as new and desire to secure by Letters Patent—

1. The spelling toy and puzzle consisting of the lettered dials A, connected together for revolution one upon the other, substantially as shown and described.

2. The combination of the lettered dials A, attached together by the center pin or rivet, B, substantially in the manner, and for the purposes set forth.

WILLIAM H. REIFF.

Witnesses:
 GEO. D. WALKER,
 C. SEDGWICK.